US012491786B2

(12) United States Patent
Miftakhov et al.

(10) Patent No.: US 12,491,786 B2
(45) Date of Patent: *Dec. 9, 2025

(54) SYSTEMS AND METHODS FOR ENABLING AUTOMATIC MANAGEMENT OF POWER LOADS AND POWER GENERATION BASED ON USER-SPECIFIED SET OF RULES

(71) Applicant: Juicebox USA, Westlake Village, CA (US)

(72) Inventors: Valery Miftakhov, San Carlos, CA (US); Alexander Gurzhi, Cupertino, CA (US); Alan White, Tiburon, CA (US)

(73) Assignee: Juicebox USA, Westlake Village, CA (US)

(*) Notice: Subject to any disclaimer, the term of this patent is extended or adjusted under 35 U.S.C. 154(b) by 306 days.

This patent is subject to a terminal disclaimer.

(21) Appl. No.: 16/951,548

(22) Filed: Nov. 18, 2020

(65) Prior Publication Data
US 2021/0070186 A1 Mar. 11, 2021

Related U.S. Application Data

(63) Continuation of application No. 15/690,275, filed on Aug. 29, 2017, now Pat. No. 10,870,358, which is a
(Continued)

(51) Int. Cl.
B60L 53/63 (2019.01)
B60L 53/30 (2019.01)
(Continued)

(52) U.S. Cl.
CPC ............ *B60L 53/63* (2019.02); *B60L 53/305* (2019.02); *B60L 53/51* (2019.02); *B60L 53/52* (2019.02);
(Continued)

(58) Field of Classification Search
CPC ........ H02J 2203/20; H02J 3/008; H02J 13/00; H02J 13/00028; H02J 13/00034;
(Continued)

(56) References Cited

U.S. PATENT DOCUMENTS 9,987,941 B2 * 6/2018 Miftakhov ............ H02J 7/0042
10,025,277 B2 7/2018 Miftakhov et al.
(Continued)

FOREIGN PATENT DOCUMENTS

KR 20180077530 A 7/2018

OTHER PUBLICATIONS

Miftakhov, et al., Office Action dated Dec. 22, 2021 for U.S. Appl. No. 17/093,428.
(Continued)

Primary Examiner — Binh C Tat
(74) Attorney, Agent, or Firm — Foley & Lardner LLP

(57) ABSTRACT

Systems and methods for enabling automatic management of arbitrary power loads and power generation based on user-specified set of rules. The aforesaid rules may be applied based on the grid conditions, parameters of specific grid equipment, as well as any other (external) factors. In various embodiments, the aforesaid user-specified rules may be automatically executed by one or more servers in response to sensed grid conditions and arbitrary external factors. In various embodiments, the aforesaid rules may cause execution of local site functions, such as powering down specific load that may help stabilize the wider power grid. In one or more embodiments, the rules may be executed on a central server or on EVSE nodes in a decentralized manner using, for example, blockchain technology well-known to persons of ordinary skill in the art.

20 Claims, 3 Drawing Sheets

Related U.S. Application Data continuation-in-part of application No. 15/004,974, filed on Jan. 24, 2016, now Pat. No. 10,399,450, which is a continuation-in-part of application No. 14/853,955, filed on Sep. 14, 2015, now Pat. No. 9,987,941.

(60) Provisional application No. 62/050,147, filed on Sep. 14, 2014.

(51) Int. Cl.
*B60L 53/51* (2019.01)
*B60L 53/52* (2019.01)
*B60L 53/66* (2019.01)
*B60L 53/68* (2019.01)
*B60L 53/65* (2019.01)

(52) U.S. Cl.
CPC ............ *B60L 53/665* (2019.02); *B60L 53/68* (2019.02); *B60L 53/65* (2019.02); *B60L 2250/20* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/12* (2013.01); *Y04S 30/14* (2013.01)

(58) Field of Classification Search
CPC .... H02J 13/00001; H02J 3/14; H02J 2310/14; H02J 2310/64; H02J 3/003; H02J 13/00002; H02J 13/00004; H02J 13/00016; H02J 2310/16; H02J 2310/48; H02J 2310/58; H02J 3/322; H02J 3/381; H02J 7/0013; H02J 7/02; H02J 3/004; H02J 3/06; H02J 3/144; H02J 3/28; H02J 3/0075; H02J 7/0014; H02J 13/00032; H04L 69/22; H04L 12/14; H04L 12/2803; H04L 69/325; G01R 31/3842; B60L 2240/54; B60L 2240/62; B60L 2240/66; B60L 2240/68; B60L 53/62; B60L 53/63; B60L 53/665; B60L 53/67; B60L 55/00; B60L 58/12; B60L 2240/72; B60L 53/30; B60L 53/68; B60L 53/64; B60L 3/00; B60L 53/18; B60L 2240/622; B60L 2260/54; B60L 50/60
USPC .................................. 320/106–115
See application file for complete search history.

(56) References Cited

U.S. PATENT DOCUMENTS

| | | | |
|---|---|---|---|
| 10,399,450 B2* | 9/2019 | Miftakhov | B60L 53/665 |
| 10,464,428 B2 | 11/2019 | Miftakhov | |
| 10,850,629 B2 | 12/2020 | Miftakhov et al. | |
| 10,870,358 B2* | 12/2020 | Miftakhov | B60L 53/51 |
| 2009/0021213 A1 | 1/2009 | Johnson | |
| 2009/0174365 A1 | 7/2009 | Lowenthal et al. | |
| 2010/0006356 A1 | 1/2010 | Curry et al. | |
| 2010/0013436 A1 | 1/2010 | Lowenthal et al. | |
| 2010/0017249 A1* | 1/2010 | Fincham | H02J 7/1446 320/108 |
| 2010/0201309 A1 | 8/2010 | Meek | |
| 2010/0217550 A1* | 8/2010 | Crabtree | H02J 3/007 702/62 |
| 2011/0001356 A1 | 1/2011 | Pollack | |
| 2011/0025267 A1 | 2/2011 | Kamen et al. | |
| 2011/0084553 A1 | 4/2011 | Adest et al. | |
| 2011/0106329 A1 | 5/2011 | Donnelly et al. | |
| 2011/0202192 A1 | 8/2011 | Kempton | |
| 2011/0202217 A1 | 8/2011 | Kempton | |
| 2011/0202418 A1 | 8/2011 | Kempton et al. | |
| 2011/0213656 A1 | 9/2011 | Turner | |
| 2012/0133337 A1 | 5/2012 | Rombouts et al. | |
| 2012/0229089 A1 | 9/2012 | Bemmel et al. | |
| 2013/0020991 A1* | 1/2013 | DeBoer | B60L 53/665 320/109 |
| 2013/0127416 A1 | 5/2013 | Karner et al. | |
| 2013/0127417 A1 | 5/2013 | Karner et al. | |
| 2013/0169226 A1 | 7/2013 | Read | |
| 2013/0169227 A1 | 7/2013 | Trimblay et al. | |
| 2013/0179061 A1* | 7/2013 | Gadh | B60L 53/63 701/1 |
| 2013/0241485 A1 | 9/2013 | Snyder | |
| 2013/0264865 A1 | 10/2013 | Sugeno et al. | |
| 2014/0062401 A1 | 3/2014 | Gadh et al. | |
| 2014/0125279 A1 | 5/2014 | Juhasz | |
| 2015/0091506 A1 | 4/2015 | Hyde et al. | |
| 2016/0236584 A1 | 8/2016 | Miftakhov et al. | |
| 2016/0236585 A1 | 8/2016 | Miftakhov et al. | |
| 2016/0257214 A1 | 9/2016 | Miftakhov et al. | |
| 2016/0339788 A1 | 11/2016 | Miftakhov | |
| 2017/0017213 A1 | 1/2017 | Miftakhov et al. | |
| 2017/0361727 A1 | 12/2017 | Miftakhov et al. | |
| 2018/0015838 A1 | 1/2018 | Miftakhov et al. | |
| 2018/0345807 A1 | 12/2018 | Cun | |
| 2020/0139834 A1 | 5/2020 | Miftakhov | |
| 2021/0070186 A1 | 3/2021 | Miftakhov et al. | |
| 2021/0229561 A1 | 7/2021 | Miftakhov et al. | |

OTHER PUBLICATIONS

Miftakhov, Notice of Allowance dated Jun. 27, 2019 for U.S. Appl. No. 15/225,821.
Miftakhov, Office Action dated Jul. 27, 2018 for U.S. Appl. No. 15/225,821.
Miftakhov, Office Action dated Nov. 10, 2020 for U.S. Appl. No. 16/675,137.
Miftakhov, Office Action dated Oct. 23, 2017 for U.S. Appl. No. 15/225,821.
Miftakhov, et al., Notice of Allowance dated Apr. 18, 2019 for U.S. Appl. No. 15/004,974.
Miftakhov, et al., Notice of Allowance dated Aug. 19, 2020 for U.S. Appl. No. 15/690,275.
Miftakhov, et al., Notice of Allowance dated Feb. 9, 2018 for U.S. Appl. No. 14/853,955.
Miftakhov, et al., Notice of Allowance dated Jul. 29, 2020 for U.S. Appl. No. 15/690,272.
Miftakhov, et al., Notice of Allowance dated Mar. 26, 2018 for U.S. Appl. No. 15/004,976.
Miftakhov, et al., Notice of Allowance dated May 21, 2019 for U.S. Appl. No. 15/004,980.
Miftakhov, et al., Office Action dated Apr. 19, 2018 for U.S. Appl. No. 15/004,974.
Miftakhov, et al., Office Action dated Apr. 20, 2017 for U.S. Appl. No. 14/853,955.
Miftakhov, et al., Office Action dated Aug. 10, 2017 for U.S. Appl. No. 15/004,980.
Miftakhov, et al., Office Action dated Jul. 13, 2017 for U.S. Appl. No. 15/004,974.
Miftakhov, et al., Office Action dated Jul. 14, 2017 for U.S. Appl. No. 15/004,976.
Miftakhov, et al., Office Action dated Jun. 27, 2019 for U.S. Appl. No. 15/690,272.
Miftakhov, et al., Office Action dated Jun. 28, 2019 for U.S. Appl. No. 15/690,275.
Miftakhov, et al., Office Action dated Mar. 4, 2020 for U.S. Appl. No. 15/690,272.
Miftakhov, et al., Office action dated Mar. 5, 2020 for U.S. Appl. No. 15/690,275.
Miftakhov, et al., Office Action dated May 18, 2018 for U.S. Appl. No. 15/004,980.

(56) References Cited

OTHER PUBLICATIONS

International Search Report and Written Opinion on PCT Appl. Ser. No Ser. No. PCT/US2020/058529 dated Mar. 3, 2021 (10 pages).

* cited by examiner

SYSTEMS AND METHODS FOR ENABLING AUTOMATIC MANAGEMENT OF POWER LOADS AND POWER GENERATION BASED ON USER-SPECIFIED SET OF RULES

CROSS-REFERENCE TO RELATED PATENT APPLICATION

This regular U.S. patent application relies upon, claims the benefit of priority from and is a continuation of U.S. patent application Ser. No. 15/690,275 filed on Aug. 29, 2017, which is a continuation-in-part of U.S. patent application Ser. No. 15/004,974 filed on Jan. 24, 2016, which is a continuation-in-part of U.S. patent application Ser. No. 14/853,955 filed on Sep. 14, 2015, which relies upon and claims the benefit of priority from U.S. provisional patent application No. 62/050,147, entitled "Grid Stabilization via a Large Distributed Collection of EV Charging Stations," filed on Sep. 14, 2014, all of which are incorporated by reference herein in their entirety.

BACKGROUND OF THE INVENTION

Field of the Invention

The disclosed embodiments relate in general to the field of electric vehicle charging technology, home electrical power storage technology and power grid management and, more specifically, to systems and methods for enabling automatic management of power loads and power generation based on user-specified set of rules.

Description of the Related Art

Wide adoption of electric vehicles by general population requires availability of substantial electrical power capacities for purposes of electric vehicle charging. Depending on the electric vehicle and the charger used, each vehicle may require 40-200 amperes of charging electric current. As would be appreciated by persons of ordinary skill in the art, simultaneous charging of a large number of electric vehicles by residents of a neighborhood may place substantial strain on the existing local power grid, which may not have been designed to accommodate such simultaneous high power loads. With the development of new electric energy storage technologies, such as graphene supercapacitors, which may be charged to full capacity in a substantially shorter times compared to conventional lithium batteries, used in most electric vehicles, this problem of handling high simultaneous charging loads will be exacerbated. In addition to electric vehicles, many houses of the future will incorporate energy storage systems, such as Tesla Powerwall battery, which may also be charged from electric grid. Charging of such energy storage systems may also put additional strain on the existing grid infrastructure.

On the other hand, currently, electric vehicle supply equipment (EVSE, a.k.a. EV charging stations) as well as other electrical power loads and power sources, such as homeowner-owned photovoltaic, wind or geothermal systems, do not provide the ability to automatically balance energy consumption and generation based on predetermined grid parameters and certain external factors. Accordingly, it would be desirable to enable various parties to specify custom load balancing rules, which would be automatically enforced based on the predetermined grid parameters and the external factors.

SUMMARY OF THE INVENTION

The inventive methodology is directed to methods and systems that substantially obviate one or more of the above and other problems associated with conventional systems and methods for electrical vehicle charging and power grid management.

In accordance with one aspect of the embodiments described herein, there is provided a system for automatic management of power loads, the system comprising: an electricity meter for reading an electric current, frequency, or voltage from an electricity supply line; a plurality of electrical loads; and a controller operatively coupled to the electricity meter and the plurality of electrical loads and operable to obtain readings from the electricity meter and to control at least one of the plurality of electrical loads based on the obtained readings in accordance with a plurality of user-specified rules.

In one or more embodiments, the plurality of electrical loads are plurality of vehicle charging stations.

In one or more embodiments, the controller comprises a server disposed on a computer network and wherein the controller is coupled to the electricity meter and the plurality of electrical loads via a computer network.

In one or more embodiments, the user-specified rules comprise a pseudo-code and wherein the controlled executes an interpreter for the pseudo-code.

In one or more embodiments, the pseudo-code comprises a plurality of statements.

In one or more embodiments, the plurality of statements comprise a statement for setting a power of a predetermined electrical load from the plurality of electrical loads.

In one or more embodiments, the plurality of statements comprise a statement for checking the voltage reading.

In one or more embodiments, the plurality of statements comprise a statement for checking the current reading.

In one or more embodiments, the plurality of statements comprise a statement for checking the frequency reading.

In one or more embodiments, the plurality of statements comprise a conditional statement.

In one or more embodiments, the controller operates to control at least one of the plurality of electrical loads based on the obtained readings and at least one environmental parameter reading in accordance with the plurality of user-specified rules.

In one or more embodiments, the at least one environmental parameter reading comprises a temperature reading.

In one or more embodiments, the at least one environmental parameter reading comprises a sunlight brightness reading.

In one or more embodiments, the at least one environmental parameter reading comprises a time reading.

In one or more embodiments, the at least one environmental parameter reading comprises a humidity reading.

In one or more embodiments, the controller comprises an access rights module for controlling an authorization of a user to specify the plurality of user-specified rules.

In one or more embodiments, the user authorization is granted or denied with respect to a predetermined domain.

In one or more embodiments, the predetermined domain is a house.

In one or more embodiments, the predetermined domain is a neighborhood.

In accordance with another aspect of the embodiments described herein, there is provided a method for automatic management of power loads, the method comprising: providing an electricity meter for reading an electric current, frequency, or voltage from an electricity supply line; providing a plurality of electrical loads; and providing a controller operatively coupled to the electricity meter and the plurality of electrical loads and operable to obtain readings from the electricity meter and to control at least one of the plurality of electrical loads based on the obtained readings in accordance with a plurality of user-specified rules.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
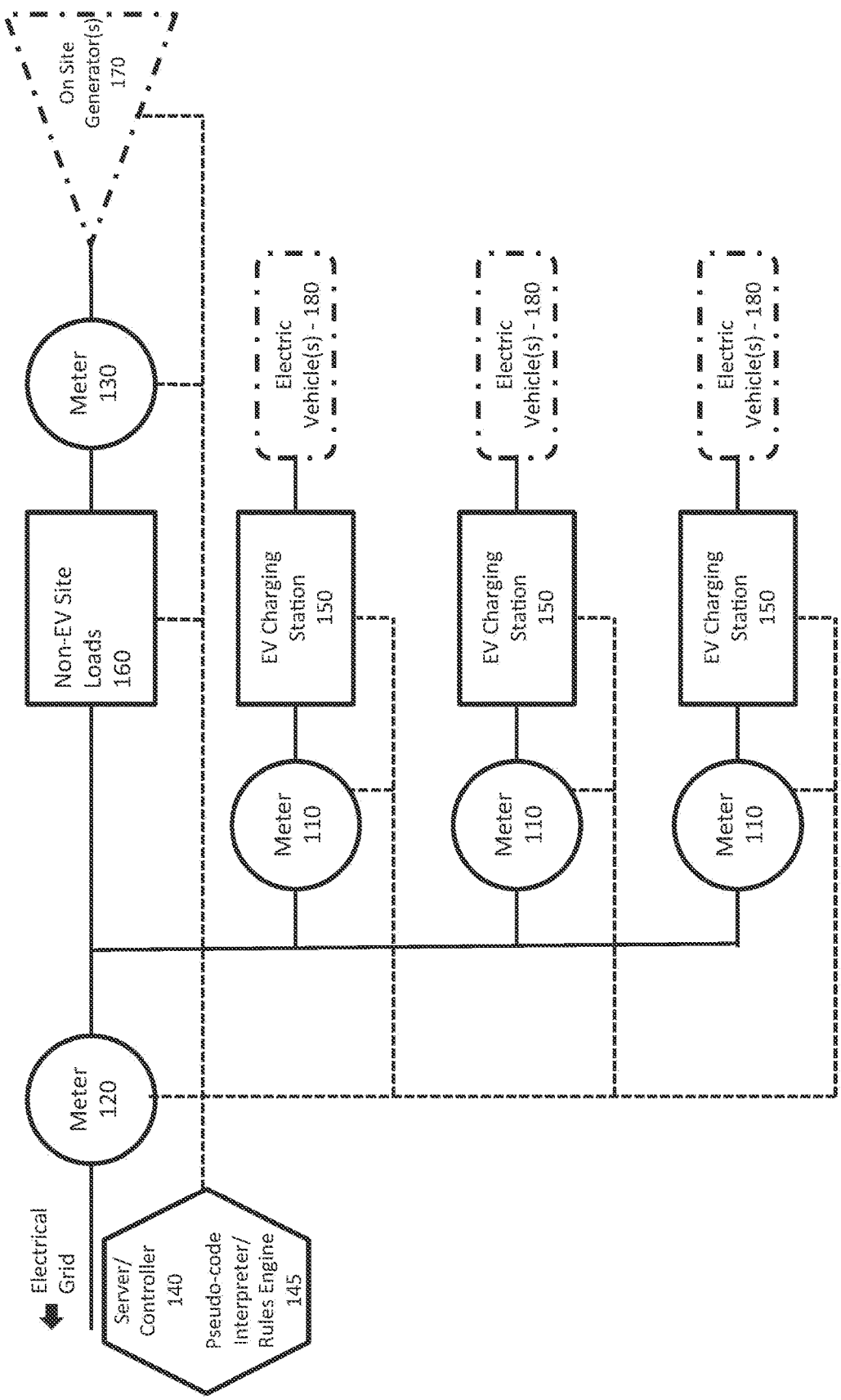
FIG. 1 illustrates an exemplary embodiment of a logical diagram of a distributed system configuration based on which the functionality described herein may be deployed.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

In accordance with one aspect of the embodiments described herein, there are provided systems and methods for enabling automatic management of arbitrary power loads and power generation based on user-specified set of rules. The aforesaid rules may be applied based on the grid conditions, parameters of specific grid equipment, as well as any other (external) factors. In various embodiments, the aforesaid user-specified rules may be automatically executed by one or more servers in response to sensed grid conditions and arbitrary external factors. In various embodiments, the aforesaid rules may cause execution of local site functions, such as powering down specific load that may help stabilize the wider power grid. In one or more embodiments, the rules may be executed on a central server or on EVSE nodes in a decentralized manner using, for example, blockchain technology well-known to persons of ordinary skill in the art.

The autonomous user-specified rule-based services and/or responses referred to throughout the present description are services that may be automatically provided by an EVSE without directed dispatch by the equipment owner or operator. Various embodiments of the described inventive concepts provide several important services to the local site as well as the wider electric grid, through the aforesaid local autonomous user-specified rule-based response function of the EVSE. In one or more embodiments, when a plug-in electric vehicle is being charged using the EVSE, the EVSE is configured to provide several automatic user-specified rule-based services, each of which provides value in different ways. Services and their automatic responses include one or more of the below-described advanced functionalities, which should not be interpreted in a limited sense.

In one or more embodiments, the aforesaid user-specified balancing rules are implemented as pseudo-code. As would be appreciated by persons of ordinary skill in the art, the abstraction level of the aforesaid pseudo-code may vary depending on the specific applications. In one or more embodiments, the aforesaid rule pseudo-code is executed by a central server, which runs a rule engine comprising an interpreter for the aforesaid pseudo-code. In another embodiment, the aforesaid pseudo-code is executed in a decentralized manner on separate EVSE nodes of the network.

In one or more embodiments, the aforesaid rule engine incorporates a security module designed to enforce access rights and permissions for running the aforesaid pseudo-code on the rule engine. The access rights may assign certain access and execution privileges to specific users and/or groups of users in connection with the pseudo-code implementing the aforesaid balancing rules. In one or more embodiments, the network is subdivided into access control domains of varying scope, which may include a household, a group of houses, a neighborhood, a city, a state and/or a country. Users may be granted permissions to access specific domains using, for example, a command:

Authorize(@unit_IDs, token), wherein the unit_IDs is a list of hardware IDs, which the user is authorized to control and the token is a security token of the user. To authorize the user associated with security token to control a specific domain with ID of @domain_ID, the following command may be used:

Authorize(@domain_IDs, token).

In one or more embodiments, the authorizations and permissions for specific users and groups are set by the administrator of the network.

In one exemplary embodiment, the EVSE or other electrical loads are equipped to enable a dynamic load sharing among themselves based on the aforesaid load-balancing rules specified in the aforesaid pseudo-code. With the aforesaid dynamic load sharing, several EVSEs automatically coordinate between themselves to optimize an electrical circuit based on the user-specified balancing rules. As would be appreciated by persons of ordinary skill in the art, without such dynamic load sharing, the number of EVSEs that may be added to a given circuit and/or feeder is capped by the aggregate maximum current rating of all EVSEs, such that the combined maximum current draw of all EVSEs operating simultaneously at full charging capacity should never exceed the capacity of the electric circuit on which they are installed. This limits the number of EVSEs that can be installed on a circuit. If more EVSEs are desired on a given circuit, the entire electric circuit must be upgraded, which could be expensive and time-consuming.

An exemplary embodiment of a first exemplary rule that may be specified in the aforesaid pseudo-code is the following:

if (getPower(unit1_ID, token)>10 KW)
setPower(unit2_ID, P/2);

In this example, the first statement checks the power level at electrical load with identifier unit1_ID and if it exceeds 10 KW, the second statement is executed. The second statement halves the power on a load unit with unit identifier unit2_ID.

An exemplary embodiment of a second exemplary rule that may be specified in the aforesaid pseudo-code is the following:

if (getVoltage(unit1_ID, token)<220V)
setPower(unit2_ID, P/2);

In this example, the first statement checks the voltage level at electrical load with identifier unit1_ID is less than 220V and, if so, the second statement is executed. The second statement halves the power on a load unit with unit identifier unit2 ID.

As would be appreciated by persons of ordinary skill in the art, any other grid or environmental parameters could be used to construct the rules in the manner described above, such as current, temperature, time, wind, sunlight brightness, humidity and the like. Therefore, the present invention is not limited to any specific parameters.

In addition, the responses performed by the aforesaid rules may also include a wide variety of responses, such as turning specific loads on and off, altering power up and down, turning on or of generators of electrical energy, and the like. Therefore, the present invention is not limited to any specific responses.

FIG. 1 illustrates an exemplary embodiment of a distributed system configuration based on which the functionality described herein may be deployed. Various elements shown in FIG. 1 and their respective functions are described in detail below.

Specifically, in one or more embodiments, the distributed system configuration shown in FIG. 1 incorporates one or more electric meters 110, configured for reading current, frequency, voltage and/or other parameters from the electric power line(s) feeding one or more corresponding individual EV charging stations 150. In one or more embodiments, the electric meters 110 are appropriately connected to return the measured meter readings via a communication path to one or more EV charging station(s) 150. In an alternative embodiment the meters 110 may be integrated into the corresponding EV charging stations 150.

In one or more embodiments, the distributed system configuration shown in FIG. 1 further incorporates an electric meter 120, which is connected between various on-site electrical loads (shown to the right thereof), including non-EV on-site loads 160 as well as EV charging stations 150, and the electric grid (shown to the left thereof). In one or more embodiments, this electric meter is configured to perform reading of current, frequency, voltage and/or other parameters from the electric supply (feed) line to the entire site. In various embodiments, the electric meter 120 is capable of returning the appropriate meter readings via a communication path to one or more EV charging station(s) 150. It should be appreciated that electric meter 120 is optional and not required not required to enable some aspects of the embodiments described herein.

In one or more embodiments, the distributed system configuration shown in FIG. 1 further incorporates one or more electric meters 130 for reading current, frequency, voltage and/or other parameters from the electricity line connecting one or more on-site renewable energy generators, such as on-site solar (e.g. photovoltaic), wind, wave, hydroelectric, biogas, fuel cell, geothermal generators and/or any other similar power generation equipment. In one or more embodiments, the electric meter(s) 130 are capable of returning respective meter readings via a communication path to one or more EV charging station(s) 150. It should be appreciated that electric meter(s) 130 is optional and not required not required to enable some aspects of the embodiments described herein.

In one or more embodiments, the distributed system configuration shown in FIG. 1 further incorporates a master controller/server 140. In various embodiments, the master controller/server 140 is implemented based on a computerized data processing system incorporating one or more processors or microcontrollers, memory and communication interface. In various embodiments, the master controller/server 140 functions as an electric vehicle charging controller with one or more of the below-described features. In one or more embodiments, the master controller/server 140 is communicatively coupled, via an appropriate wired or wireless data interconnect, to one or more of the above-described electrical meters 110, 120 and 130. As such, the master controller/server 140 is capable of receiving the reading(s) from the corresponding electric meters. Possible embodiments of the aforesaid data interconnects include WIFI communication interface, USB interface, IP-based network interface as well as any other now known or later developed data communication interfaces. It should be appreciated that the embodiments described herein are not dependent on the specific type of the communication interface used for connecting the master controller/server 140 to the electrical meters 110, 120 and 130.

In one embodiment, the master controller/server 140 includes a pseudo-code interpreter/rule engine 145 configured to execute the aforesaid load-balancing rules specified in the aforesaid pseudo-code. For this purpose, the code interpreter/rule engine 145 receives various parameters of the grid and environment.

In one or more embodiments, the master controller/server 140 is communicatively coupled, via an appropriate data communication interconnect, to a user application hosted on a remote server and/or station controls. In one embodiment, the master controller/server 140 sends measurement and/or other data to the aforesaid user application and receives user commands.

In one or more embodiments, the master controller/server 140 incorporates a logic to determine appropriate charging output current for one or more EV charging stations 150 and/or other on-site loads in response to one or more readings of the electrical meters 110, 120 and 130. In one or more embodiments, the aforesaid logic may be implemented using one or more processors executing one or more software applications embodying the corresponding functionality. In various embodiments, the master controller/server 140 is connected to the internet and has capability to automatically download from an external storage server and install the aforesaid software applications implementing the described logic.

In one or more embodiments, the master controller/server 140 further incorporates an interface for directing EV charging stations 150 to vary charging load to one or more electric vehicles based upon the determinations made by the above-described internal logic. In various embodiments, the aforesaid interface may be implemented using any now known or later developed wired or wireless interconnect.

Finally, in one or more embodiments, the master controller/server 140 incorporates a storage system for storing one or more custom presets and/or other parameters or data associated with the local circuit and/or utility feeder, frequency response requirements, and/or the aforesaid CVR requirements. In one or more embodiments, the aforesaid parameters may be stored in a database executing on one or more processors of the master controller/server 140.

It should be further noted that in one exemplary embodiment, the above-described functionality of the master controller/server 140 may be integrated into one or more of the EV charging stations 150.

In one or more embodiments, the described distributed system configuration shown in FIG. 1 further incorporates one or more EV charging stations 150 with slave control capability. Each EV charging station 150 is intermittently connectable to one or more electric vehicles (EVs) 180 and configured to provide electric charge thereto. These electric vehicles (EVs) 180 may exist in various states of charge. In various embodiments, the EV charging stations 150 may incorporate one or more of the below-described features. In one embodiment, the EV charging stations 150 have the capability to vary electric vehicle charge and discharge rate according to internal controls, commands received from the master controller/server 140 and/or commands received from user application.

In one embodiment, the one or more EV charging stations 150 have the capability to receive vehicle owner's preferences or user commands via one or more hardware controls disposed directly or indirectly on the EV charging stations 150 or via a user interface co-located with the respective EV charging station 150. In another embodiment, the EV charging stations 150 are capable of receiving owner's preferences or commands via a network interface communicable, via an appropriate wired or wireless network, with a mobile application executing on user's mobile device.

In one embodiment, the one or more EV charging stations 150 further have the capability to display directly to the user (using a co-located user interface or otherwise) or to communicate to a remote server application or user's mobile application one or more of the following information items: 1) real time charging information; 2) vehicle owner charging preferences; 3) alerts regarding charging status; 4) vehicle state of charge; and/or 5) estimated time to completion of charge.

In one or more embodiments, the described distributed system configuration shown in FIG. 1 further incorporates one or more non-EV on-site loads 160. The aforesaid non-EV on-site loads 160 comprise loads such as air conditioning, lighting, plug loads, etc. It should be noted that, in various embodiments, these loads 160 may be independently metered and/or controlled by the EV charging stations 150 autonomous logic controls.

In one or more embodiments, the described distributed system configuration shown in FIG. 1 further incorporates one or more on-site generator(s) 170. The generators 170 may include one or more renewable and/or non-renewable electric energy generators, which may be located behind or in front of the on-site loads within the electric circuit. In various embodiments, the generators 170 may be controllable by the logic of the EV charging station(s) 150.

In one or more embodiments, the described distributed system configuration shown in FIG. 1 further incorporates communication path 190 interconnecting the electric meters 110, 120 and 130, EV charging stations 150, master controller/server(s) 140, on-site generators 170 and/or non-EV site loads 160. This communication path may be implemented using any now known or later developed interconnect.

Finally, in one or more embodiments, the described distributed system configuration shown in FIG. 1 further incorporates electricity path 195, which may be comprised of electric power conductors transmitting electrical energy from the electric grid to various on-site loads and generators.

Figure 2:
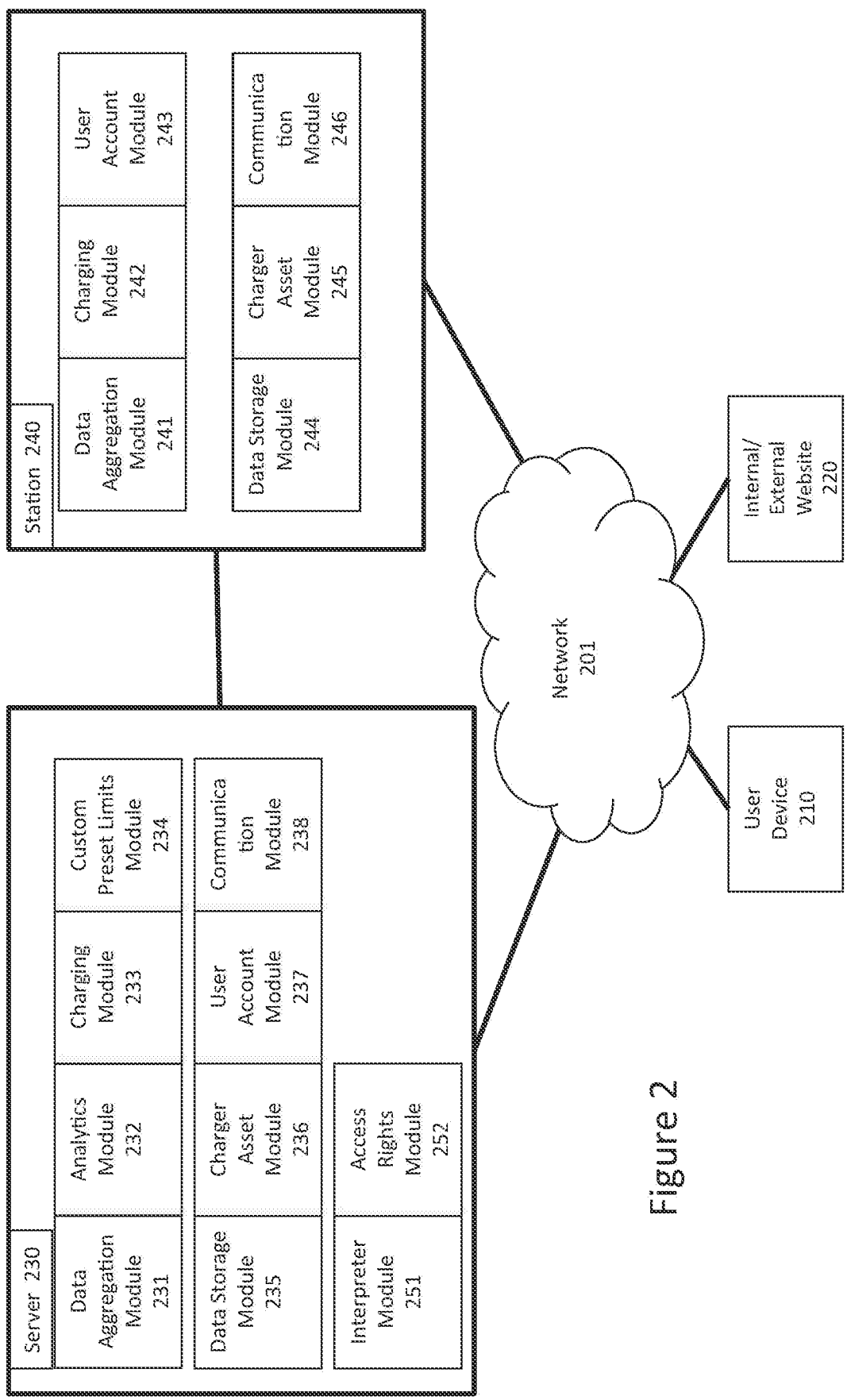
FIG. 2 illustrates certain exemplary internal components of the described distributed system shown in the logical diagram of FIG. 1.

FIG. 2 illustrates certain exemplary internal components of the described distributed system shown in the logical diagram of FIG. 1. Specifically, a server system 230, which may perform the functions of the master controller/server 140 of FIG. 1, incorporates multiple integral components or modules described in detail below. In one or more embodiments, the server 230 incorporates a data aggregation module 231 configured for receiving and aggregating the measured data from various meters including, without limitation, the electric meters 110, 120 and 130.

In various embodiments, the server system 230 further incorporates an analytics module 232 for performing analysis of the measured data from various meters including, without limitation, the electric meters 110, 120 and 130. The server system 230 may further incorporate a charging module 233 for controlling the charging of one or more electric vehicles 180 by the EV charging stations 150. In various embodiments, the server system 230 may further incorporate a custom preset limits module 234 storing presets reflecting the operating limits of the EV or other loads requiring charging.

In one or more embodiments, the server system 230 may further incorporate a data storage module 235, storing and managing all of the data collected by multiple electric meters, including, without limitation, the electric meters 110, 120 and 130 and corresponding to various charging stages and charging events. The server system 230 may further incorporate a user account module 236 for managing one or more user accounts and storing and managing the associated user data, user preferences and other related information. In various embodiments, the aforesaid user account data managed by the user account module 236 may include the user authentication information for authenticating the user, and user preference data representing user charging preferences, such as time and rate of charging.

In one or more embodiments, the server system 230 may further incorporate a charger asset module 237, which is configured to automatically identify each asset which charges electrical vehicles, home energy storage systems, appliances or other loads. The server system 230 may further incorporate a communication module 238 configured to enable communication between the server system 230, the electric meters 110, 120 and 130 and the EV charging stations 150.

In one or more embodiments, the server system 230 may further incorporate a pseudo-code interpreter/rule module 251 configured to execute the aforesaid load-balancing rules specified in the aforesaid pseudo-code. For this purpose, the code interpreter/rule module 251 receives various parameters of the grid and environment. In addition, the access rights module 252 may be provided to enforce the access controls described above.

In one or more embodiments, the charging station 230, which may function as the aforesaid EV charging station 150, incorporates a data aggregation module 241, a charging module 242, a user account module 243, a data storage module 244, a charger asset module 245 and a communication module 246, which have functions, which are generally similar to the respective functions of the corresponding modules of the server system 230.

Figure 3:
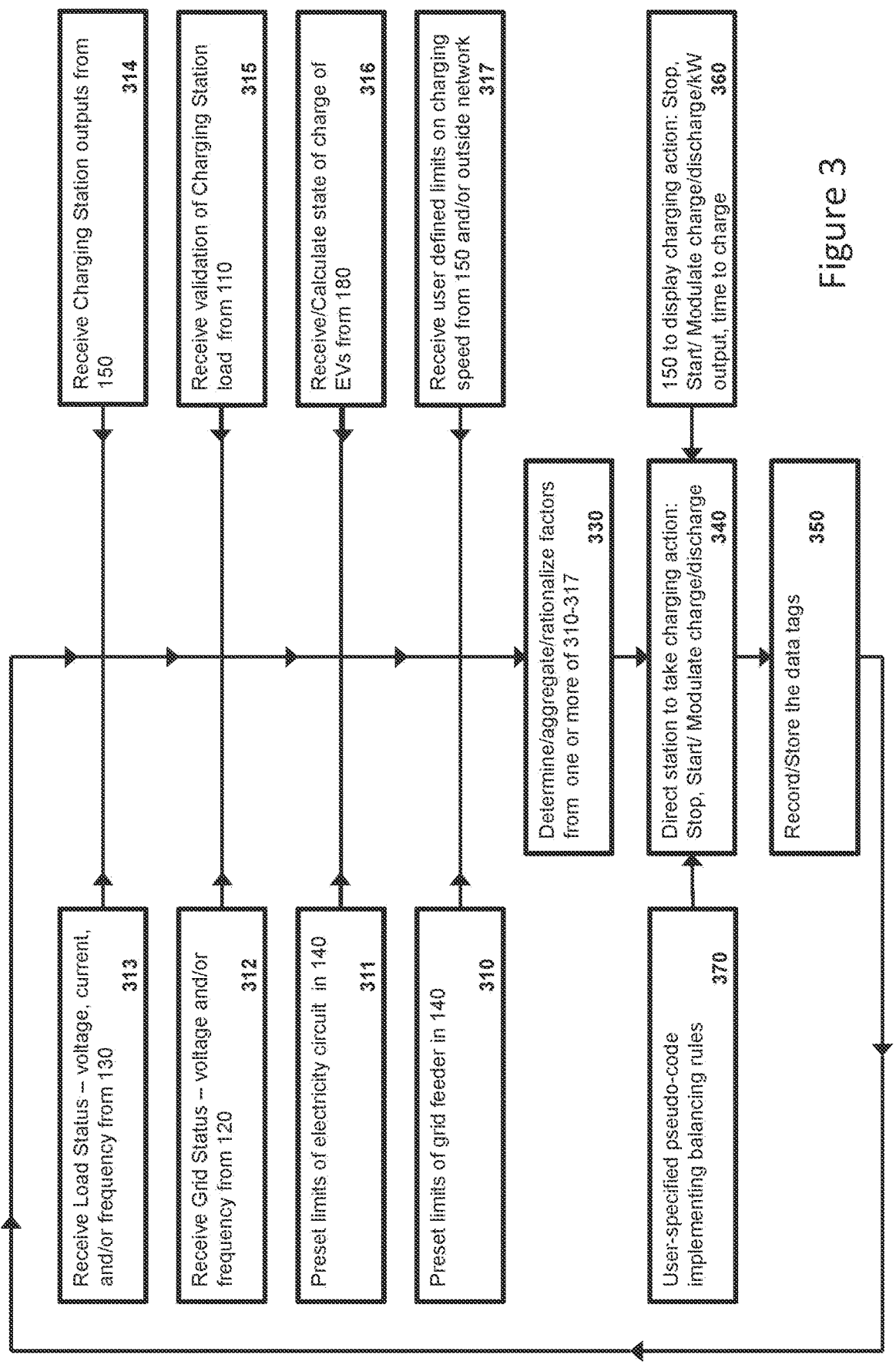
FIG. 3 illustrates a block diagram of an exemplary embodiment of an automated dispatch method performed by a remote server or a charging station.

FIG. 3 illustrates a block diagram of an exemplary embodiment of an automated dispatch method performed by the remote server 140 or the charging station 150, either of which is being referred to below as "the system".

First, at step 313, the system receives electrical load status information, including, without limitation, the frequency, voltage, current, and amperage readings from a meter, such as the electric meter 130 shown in FIG. 1.

Subsequently, at step 312, the system receives electrical grid status information, including, without limitation, the frequency, voltage, current, and amperage readings from a meter, such as the electric meter 120 shown in FIG. 1.

After that, at step 311, the system establishes preset limits of the electric circuit, using, for example, the custom preset limits module 234 of the server 230 shown in FIG. 2 or server/controller 140 shown in FIG. 1.

After that, at step 311, the system establishes grid feeder limits, and stores those limits in the appropriate module of the server/controller 140 illustrated in FIG. 1.

At step 314, the system receives the output data from the EV charging stations 150 shown in FIG. 1 or other EVSE.

At step 315, the system receives independent validation of an electric vehicle charging load from, for example, the electric meters 100 shown in FIG. 1.

At step 316, the system receives the state of charge (SoC) information from electric vehicles 180 shown in FIG. 1.

At step 317, the system receives one or more commands from a user, using, for example, the user mobile device 210 shown in FIG. 2, to define certain predetermined parameters, such as user-specified speed of charge of the EV.

At step 330, the system rationalizes all of the data and other factors received in the aforesaid steps 310-317.

At step 340, the system issues a command for the charging station 150 to take the appropriate action, such as to stop, start, or modulate charging of the asset, such as the EV 180 in FIG. 1 using the user-specified pseudo-code 370 implementing the balancing rules described above.

At step 350, the system stores all the relevant data and the corresponding data tags.

At step 360, the system causes the charging station 150 to display the taken charging action, such as stopping, starting or modulating the charging, as commanded by the dispatch server using the data tags.

As would be appreciated by persons of ordinary skill in the art, the above-described inventive concepts may be applied not only to electric vehicle charging stations, but also to any other systems, which are configured to deliver electric power to electric loads. Examples of such systems may include home energy storage systems, heating systems, air conditioning systems, etc.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in systems and methods for generating automatic responses to local conditions or to the changing needs of the larger electric power grid. It is intended that the specification and examples be considered as exemplary only, with a true scope and spirit of the invention being indicated by the following claims.

What is claimed is:

1. A system for automatic management of power loads, the system comprising:
an electricity meter for reading an electric current, frequency, or voltage from an electricity supply line;
one or more rules for load-balancing power among a plurality of electrical loads corresponding to a plurality of electric vehicle charging stations, the one or more rules specified by a user for an electric vehicle of a plurality of electric vehicles to be coupled with the plurality of electrical loads; and
a controller operatively coupled to the electricity meter and the plurality of electrical loads and operable to obtain readings from the electricity meter and to change an amount of power configured to be applied to at least one of the plurality of electrical loads corresponding to the electric vehicle based on the obtained readings and in accordance with the one or more rules,
wherein the controller is operable to use state of charge information from the plurality of electric vehicles, the obtained readings and the one or more rules to change the amount of power from a first amount to a second amount that is greater than zero so as to load-balance power among the plurality of electrical loads coupled with the plurality of electric vehicles comprising the vehicle of the user.

2. The system for automatic management of power loads of claim 1, wherein the system establishes preset limits for the plurality of electrical loads corresponding to the plurality of electric vehicle charging stations, and wherein the controller is operable use the one or more rules to load-balance the power according to the preset limits.

3. The system for automatic management of power loads of claim 1, wherein the controller comprises a server disposed on a computer network and wherein the controller is coupled to the electricity meter and the plurality of electrical loads via the computer network and operable to change the amount of power configured to be applied to the at least one of the plurality of electrical loads based on a preference of the user of the electric vehicle.

4. The system for automatic management of power loads of claim 1, wherein the one or more rules comprise a pseudo-code and wherein the controller executes an interpreter for the pseudo-code.

5. The system for automatic management of power loads of claim 4, wherein the pseudo-code comprises a plurality of statements.

6. The system for automatic management of power loads of claim 5, wherein the plurality of statements comprise a statement for setting a power of a predetermined electrical load from the plurality of electrical loads.

7. The system for automatic management of power loads of claim 5, wherein the plurality of statements comprise a statement for checking the voltage reading.

8. The system for automatic management of power loads of claim 5, wherein the plurality of statements comprise a statement for checking the current reading.

9. The system for automatic management of power loads of claim 5, wherein the plurality of statements comprise a statement for checking the frequency reading.

10. The system for automatic management of power loads of claim 5, wherein the plurality of statements comprise a conditional statement.

11. The system for automatic management of power loads of claim 1, wherein the controller operates to control at least one of the plurality of electrical loads based on the obtained readings and at least one environmental parameter reading in accordance with the one or more rules.

12. The system for automatic management of power loads of claim 11, wherein the at least one environmental parameter reading comprises a temperature reading.

13. The system for automatic management of power loads of claim 11, wherein the at least one environmental parameter reading comprises a sunlight brightness reading.

14. The system for automatic management of power loads of claim 11, wherein the at least one environmental parameter reading comprises a time reading.

15. The system for automatic management of power loads of claim 11, wherein the at least one environmental parameter reading comprises a humidity reading.

16. The system for automatic management of power loads of claim 1, wherein the controller comprises an access rights module for controlling an authorization of a user to specify the one or more rules.

17. The system for automatic management of power loads of claim 1, wherein the user authorization is granted or denied with respect to a predetermined domain.

18. The system for automatic management of power loads of claim 17, wherein the predetermined domain is a house.

19. The system for automatic management of power loads of claim 17, wherein the predetermined domain is a neighborhood.

20. A method for automatic management of power loads, the method comprising:
providing an electricity meter for reading an electric current, frequency, or voltage from an electricity supply line;
providing one or more rules for load-balancing power among a plurality of electrical loads corresponding to a plurality of electric vehicle charging stations, the one or more rules specified by a user for an electric vehicle of a plurality of electric vehicles to be coupled with the plurality of electrical loads; and
providing a controller operatively coupled to the electricity meter and the plurality of electrical loads and operable to obtain readings from the electricity meter and to change an amount of power applied to at least one of the plurality of electrical loads corresponding to the electric vehicle based on the obtained readings and in accordance with the one or more rules,
wherein the controller is operable to use state of charge information from the plurality of electric vehicles, the obtained readings and the one or more rules to change the amount of power from a first amount to a second amount that is greater than zero so as to load-balance power among the plurality of electrical loads coupled with the plurality of electric vehicles comprising the vehicle of the user.

* * * * *